US010936218B2

(12) United States Patent
Rakulenko et al.

(10) Patent No.: US 10,936,218 B2
(45) Date of Patent: Mar. 2, 2021

(54) FACILITATING AN OUT-OF-ORDER TRANSMISSION OF SEGMENTS OF MULTI-SEGMENT DATA PORTIONS FOR DISTRIBUTED STORAGE DEVICES

(71) Applicant: EMC IP Holding Company LLC, Hopkinton, MA (US)

(72) Inventors: Aleksandr Rakulenko, Seattle, WA (US); Mikhail Danilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/388,014

(22) Filed: Apr. 18, 2019

(65) Prior Publication Data

US 2020/0333966 A1    Oct. 22, 2020

(51) Int. Cl.
*G06F 3/06* (2006.01)
*H04L 29/06* (2006.01)
*H04L 29/08* (2006.01)

(52) U.S. Cl.
CPC ............ *G06F 3/0631* (2013.01); *G06F 3/064* (2013.01); *G06F 3/067* (2013.01); *G06F 3/0626* (2013.01); *H04L 67/1097* (2013.01); *H04L 69/166* (2013.01)

(58) Field of Classification Search
CPC ........ G06F 3/0631; G06F 3/064; G06F 3/067; G06F 3/0626; H04L 69/166; H04L 67/1097

See application file for complete search history.

(56) References Cited

U.S. PATENT DOCUMENTS

| 5,835,935 | A  | * | 11/1998 | Estakhri ............... G06F 3/0601 711/103 |
| 6,189,081 | B1 | * | 2/2001  | Fujio .................... G06F 3/0616 711/171 |
| 8,429,165 | B1 | * | 4/2013  | Jung ..................... G06F 16/958 707/737 |
| 9,128,953 | B1 | * | 9/2015  | Singh .................... G06F 16/178 |
| 9,876,612 | B1 | * | 1/2018  | Maveli .................. H04L 1/1642 |
| 2003/0065899 | A1 | * | 4/2003 | Gorobets ............. G06F 3/0613 711/165 |

(Continued)

*Primary Examiner* — Tasnima Matin
(74) *Attorney, Agent, or Firm* — Amin, Turocy & Watson, LLP

(57) ABSTRACT

Facilitating transmission of multi-segment data portions for storage devices is provided herein. A system can comprise a processor and a memory that stores executable instructions that, when executed by the processor, facilitate performance of operations. The operations can comprise sending a read request for object data associated with an object, wherein the object data comprises multiple segments distributed across nodes of a storage cluster. The operations also can comprise receiving an out of order transmission that comprises the multiple segments. Further, the operations can comprise ordering segments of the multiple segments based on respective packet sequence numbers associated with the segments, resulting in a properly ordered object data. According to some implementations, the respective packet sequence numbers can be respective precalculated ranges of packet sequence numbers associated with the segments of the multiple segments.

20 Claims, 12 Drawing Sheets

(56) References Cited

U.S. PATENT DOCUMENTS

| | | | |
|---|---|---|---|
| 2005/0160312 A1* | 7/2005 | Seng | G06F 11/2097 714/13 |
| 2007/0168824 A1* | 7/2007 | Fukushima | H04L 1/1877 714/748 |
| 2009/0213850 A1* | 8/2009 | Viger | H04L 47/10 370/389 |
| 2011/0099351 A1* | 4/2011 | Condict | G06F 3/0608 711/216 |
| 2012/0155468 A1* | 6/2012 | Greenberg | H04L 69/14 370/392 |
| 2013/0339818 A1* | 12/2013 | Baker | H03M 13/356 714/763 |
| 2017/0123728 A1* | 5/2017 | Rungta | G06F 3/0619 |

* cited by examiner

FACILITATING AN OUT-OF-ORDER TRANSMISSION OF SEGMENTS OF MULTI-SEGMENT DATA PORTIONS FOR DISTRIBUTED STORAGE DEVICES

TECHNICAL FIELD

The subject disclosure relates generally to data storage. More specifically, the subject disclosure relates to transmission of multi-segment data portions.

BACKGROUND

Distributed storage systems and/or object storage systems can provide a wide range of storage services while achieving high scalability, availability, and serviceability. An example of such storage systems is referred to as ECS (ECS™, formerly known as Elastic Cloud Storage, is an object storage system by Dell EMC production), which uses the latest trends in software architecture and development to achieve the above noted services, as well as other services.

ECS assures an extreme density of user data storage. Such a system may suffer from low performance of read operations. In order to improve the read performance characteristics, various techniques can be applied, which can increase a volatile memory footprint of the system. Accordingly, unique challenges exist to improve read performance characteristics.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a method that can comprise receiving, by a system comprising a processor and from a client device, a read request for object data. The object data comprises multiple segments stored across a storage cluster. The method also can comprise obtaining, by the system, the multiple segments in response to the read request. Segments of the multiple segments can be obtained from one or more nodes of the storage cluster. In addition, the method can comprise transmitting, by the system, the segments of the multiple segments, in a received order. The received order can be an arbitrary order of the multiple segments. Further, an ordering of the object data can be facilitated at the client device based on respective sequence numbers of the segments of the multiple segments.

According to some implementations, respective sequence numbers can comprise respective precalculated ranges of packet sequence numbers for the segments of the multiple segments.

In some implementations, the object data can occupy a continuous range of packet sequence numbers. Further to these implementations, the method can comprise assigning, by the system, a first range of the packet sequence numbers to a first packet of the multiple segments, assigning, by the system, a second range of the packet sequence numbers to a second packet of the multiple segments, and assigning, by the system, a third range of the packet sequence numbers to a third segment of the multiple segments. Alternatively, or additionally, the method can comprise using, by the system, a default packet size from a set of reserved packet ranges.

According to some implementations, the multiple segments can comprise a first segment obtained from a first node of the storage cluster, a second segment obtained from a second node of the storage cluster, and at least a third segment obtained from at least a third node of the storage cluster.

In some implementations, the method can comprise, prior to transmitting the segments of the multiple segments in the received order, determining, by the system, that a storage capacity of the client device satisfies a defined storage capacity. Further to these implementations, the defined storage capacity can be a first defined storage capacity and determining the storage capacity of the client device can comprise determining the storage capacity is below the first defined storage capacity and above a second defined storage capacity Further, determining the storage capacity can comprise dividing the multiple segments into a first group of segments and a second group of segments. In addition, determining the storage capacity can comprise transmitting the first group of segments to the client device and after a defined interval, transmitting the second group of segments to the client device.

According to some implementations, determining the storage capacity can comprise determining the storage capacity fails to satisfy the defined storage capacity and ordering the multiple segments prior to transmitting the multiple segments to the client device.

In accordance with some implementations, the method can comprise ignoring, by the system, duplicate acknowledgments received in response to transmitting the segments of the multiple segments in the received order. The arbitrary order of the multiple segments can comprise an out of order transmission of the multiple segments, according to some implementations.

Another embodiment relates to a system that can comprise a processor and a memory that stores executable instructions that, when executed by the processor, facilitate performance of operations. The operations can comprise sending a read request for object data associated with an object, wherein the object data comprises multiple segments distributed across nodes of a storage cluster. The operations also can comprise receiving an out of order transmission that comprises the multiple segments. Further, the operations can comprise ordering segments of the multiple segments based on respective packet sequence numbers associated with the segments, resulting in a properly ordered object data. According to some implementations, the respective packet sequence numbers can be respective precalculated ranges of packet sequence numbers associated with the segments of the multiple segments.

In accordance with some implementations, the object data can occupy a continuous range of packet sequence numbers. Further to these implementations, the operations can comprise determining a first segment based on a first range [sn1, sn2], determining a second segment based on a second range [sn2, sn3], and determining a third segment based on a third range [sn3, sn4].

The multiple segments can comprise a first segment received from a first node of the storage cluster, a second segment received from a second node of the storage cluster, and at least a third segment received from at least a third node of the storage cluster.

Another embodiment relates to a computer-readable storage medium comprising instructions that, in response to execution, cause a system comprising a processor to perform operations. The operations can comprise determining a storage capability of a client device based on receipt of a read request for object data. The object data can comprise multiple segments stored across a storage cluster. The operations also can comprise obtaining the multiple segments in response to the read request. Segments of the multiple segments can be obtained from one or more nodes of the storage cluster. Further, the operations can comprise transmitting the multiple segments in two portions based on the storage capability of the client device satisfying a first defined storage capability. A first portion of the two portions can comprise a first group of segments of the multiple segments and a second portion of the two portions can comprise a second group of segments of the multiple segments. Alternatively, the operations can comprise transmitting the segments of the multiple segments in a received order based on the storage capability of the client device satisfying a second defined storage capability.

According to some implementations, the received order can be an arbitrary order of the multiple segments. Further, an ordering of the object data can be facilitated at the client device based on respective sequence numbers of the segments of the multiple segments.

Transmitting the multiple segments in the two portions can comprise, according to some implementations, transmitting the first group of segments to the client device and, after a defined interval, transmitting the second group of segments to the client device.

Ordering of the object data can be facilitated at the client device based on respective sequence numbers of the segments of the multiple segments. The respective sequence numbers can comprise respective precalculated ranges of packet sequence numbers for the segments of the multiple segments.

The object data can occupy a continuous range of packet sequence numbers and the operations can comprise assigning a first range of the packet sequence numbers to a first packet of the multiple segments. The operations also can comprise assigning a second range of the packet sequence numbers to a second packet of the multiple segments. Further, the operations can comprise assigning a third range of the packet sequence numbers to a third segment of the multiple segments.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

As mentioned, a wide range of data storages are available. One example of data storage is ECS, which is a cluster-based object storage. Read performance characteristics in ECS can be relatively low. In order to improve the read performance characteristics, ECS applies a certain technique, which increases a volatile memory (Random Access Memory (RAM)) footprint of the system. The various aspects provided herein can accelerate data reads in ECS and other data storage systems using some specific features of a Transmission Control Protocol/Internet Protocol (TCP/IP) stack. The disclosed aspects can improve the performance characteristics of ECS and, at substantially the same time, can reduces a footprint of the system in RAM. Generally, one is achieved at the expense of another or vice versa.

Figure 1:
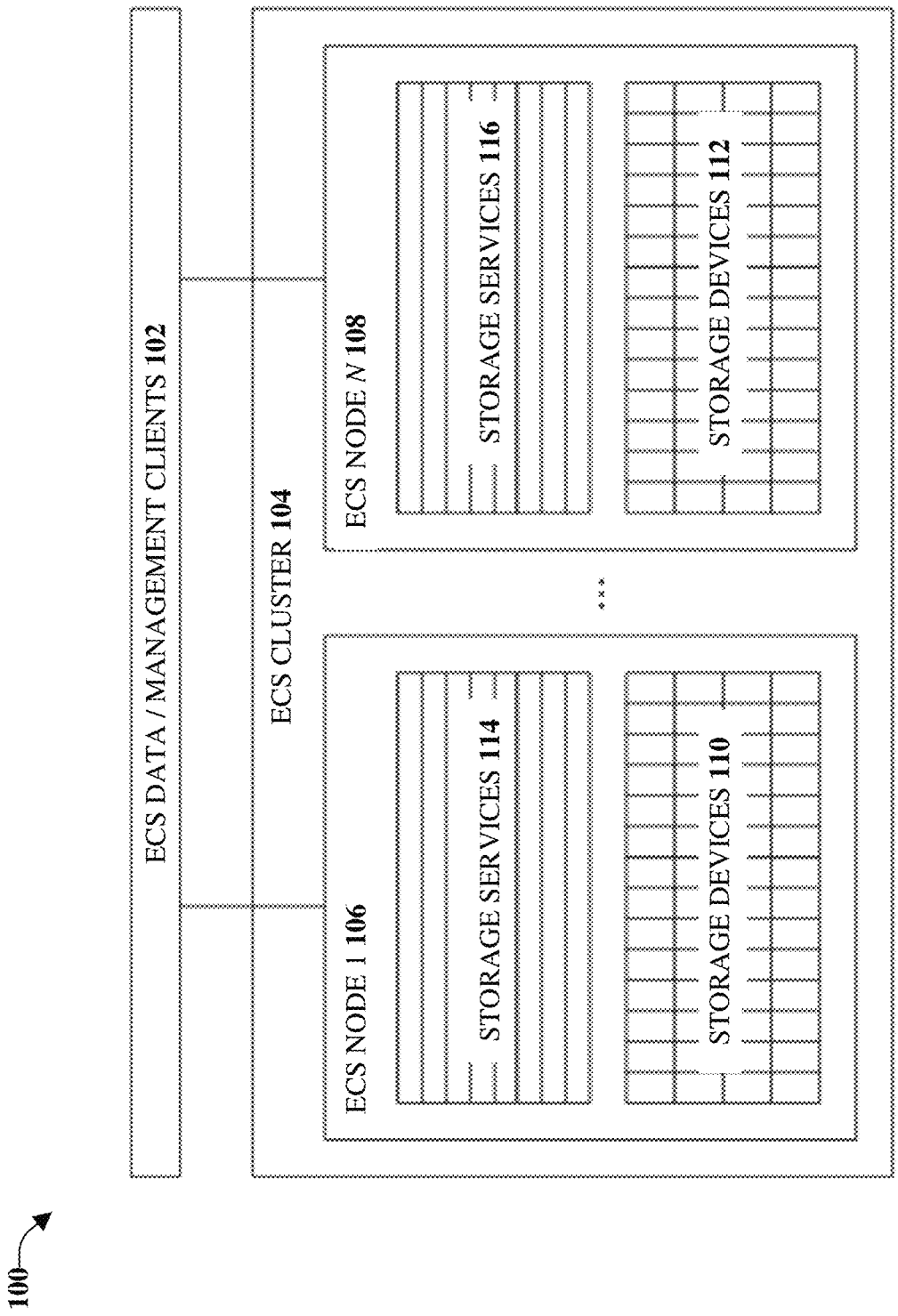
FIG. 1 illustrates an example, non-limiting, high-level cluster architecture for storage devices in accordance with one or more embodiments described herein.

FIG. 1 illustrates an example, non-limiting, cluster architecture 100 for storage devices in accordance with one or more embodiments described herein. The cluster architecture 100 is illustrated at a high-level and can be implemented as an ECS cluster architecture, for example. However, the disclosed aspects are not limited to an ECS implementation and other data storages can be utilized.

ECS data/management clients 102 can be serviced by an ECS cluster 104 that can comprise several (N) nodes, illustrated as a first ECS Node 106 (or ECS Node 1) through a Nth ECS Node 108 (or ECS Node N), where N is an integer. The nodes (e.g., the first ECS Node 106 through the Nth ECS Node 108) can manage several storage devices (e.g. hard drives), illustrated as a first set of storage devices 110 and a Nth set of storage devices 112. It is noted that a single ECS node can manage from around fifteen to about one hundred and twenty storage devices, for example.

The ECS nodes (e.g., the first ECS Node 106, the Nth ECS Node 108) can run a number of storage services, illustrated as first storage services 114 through an Nth storage services 116. A single node that runs ECS can manage about twenty (or more) independent services. For example, these services can be a blob service, a chunk management service, a storage server management service, and a shared memory service. However, other services could also be provided.

The blob service (e.g., Blob Service (BS)) can keep track of all objects in the system. For the chunk management service (e.g., Chunk Manager (CM)), all disk space in ECS is partitioned into a set of blocks of fixed size called chunks. All the information, user data and a variety of metadata, is stored in these chunks. Chunks are shared. The chunks can be modified in append-only mode and once a chunk is full enough it becomes immutable. CM is the service that manages chunks. The storage server management service (e.g., Storage Service Manager (SSM)) keeps track of free and used capacity blocks. Further the shared memory service (e.g., Shared Memory Service (also referred to as VNest)) can guarantee a single view on cluster-level data for all cluster nodes. VNest guarantees that at least V nodes (normally five) called members share the same view on the cluster state.

There are different types of chunks, one type per capacity user. In particular, user data is stored in repository chunks (or simply repo chunks). The metadata is stored in tree-like structures, referred to as "tree chunks." Chunks of the one or more types (e.g., repo chunks and tree chunks) are shared. For example, a repo chunk can contain segments of several user objects and a tree chunk can contain elements of several trees.

ECS runs a set of storage services, which together implement business logic of storage, which is referred to as "blob service." Blob service maintains an object table that keeps track of all objects in the system. In particular, the object table contains location information for the objects. There is also a chunk manager service that maintains a chunk table. As indicated by its name, ECS is a cloud storage. The corresponding feature is called GEO since ECS supports geographically distributed setups consisting of two or more zones.

Figure 2:
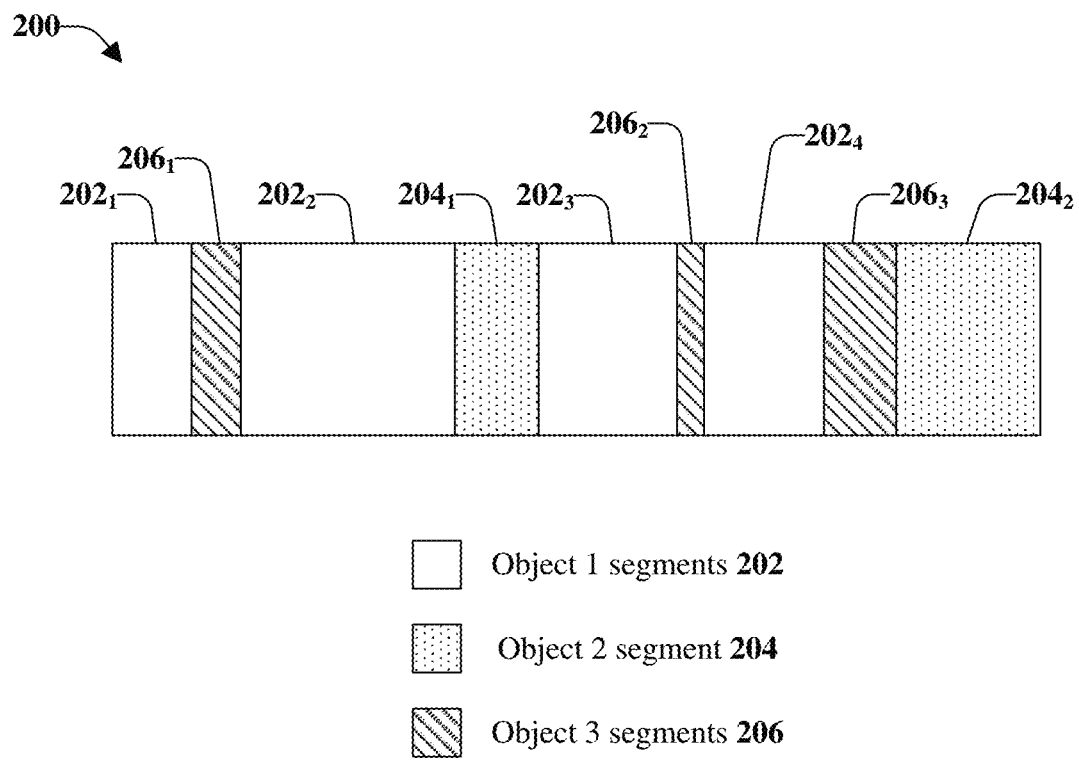
FIG. 2 illustrates an example, non-limiting, standard layout of a chunk in accordance with one or more embodiments described herein.

ECS uses a specific method for disk capacity management. ECS hardly relies on a file system. All disk space is partitioned into a set of blocks of fixed size called chunks. All user data is stored in these chunks and the chunks are shared. One chunk may (and in most cases it does) contain segments of several user objects. FIG. 2 illustrates an example, non-limiting, standard layout of a chunk 200 in accordance with one or more embodiments described herein.

One chunk (e.g., the chunk 200) can include mixed segments of several user objects. For example, chunk 200 includes first object segments 202 (e.g., object 1 segments 2021, 2022, 2023, and 2024), second object segments 204 (object 2 segments 2041 and 2042), and third object segments 206 (object 3 segments 2061, 2062, and 2063). In the general case, one user data object can be stored as a set of around two Mega Bytes (~2 MB) segments that reside in several chunks stored to different cluster nodes/disks and managed by different cluster nodes.

The information about all the objects within the system and their locations is stored an Object Table. When a client device reads an object, there is a node device to serve the read request. The node device reads the object's segments from different chunks stored to different nodes/disks. Note that in order to achieve a higher performance level, the node device can read the segments of the object in parallel (e.g., at substantially the same time). Then, the node device obtains the segments, orders the segments, and sends the result as a single data portion to the client device.

However, there can be problems associated with serving read requests with the implementation of the read path described above. The fact that the storage system orders object segments cam lead to low performance. For example, one relatively slow node/disk with one of first segments of an object can block data transmission to a client. To overcome this and other challenges, the disclosed aspects relate to serving read requests in data storage systems including ECS.

The disclosed aspects relate to the transmission of multi-segment data portions (e.g. objects). It is noted that ECS is used as an example storage system to describe the disclosed aspects. However, many, if not all, cluster-based unstructured data storages can employ the disclosed aspects. For example, a practice can be to split data portions (e.g. files, objects, or streams) into a set of fragments/segments and store them independently to different cluster nodes.

The disclosed aspects can utilize the properties of Internet Protocol (IP) and Transmission Control Protocol (TCP) network protocols. Additionally, other network protocols with similar properties can be used to implement the disclosed aspects.

IP is the principal communications protocol in the Internet protocol suite for relaying packets across network boundaries. IP uses dynamic routing. Every packet is treated independently and the network maintains no state based on the path of prior packets. That is why different packets can be routed to the same destination via different paths, resulting in out-of-order delivery to the receiver, where packets are delivered in a different order from which they were sent.

TCP complements IP to provide reliable, ordered, and error-checked delivery of data. TCP uses sequence numbers to identify an order of bytes sent from a network device (e.g. computer). TCP uses a positive acknowledgement with re-transmission technique to assure reliable delivery of data.

According to various implementations, the capacity of TCP is utilized to assure ordered delivery of data. For example, the one or more segments of an object can be transmitted as the node devices that serves the read request for the object receives the one or more segments. During this "out-of-order transmission" the network packets with segment data can be assigned the sequence numbers the network packet would have if the segments were transmitted in the correct order (e.g., not an out-of-order transmission).

The TCP implementation at the storage client side can order the network packets by their sequence numbers. At the end, the client application receives the ordered version of the object data.

Figure 3:
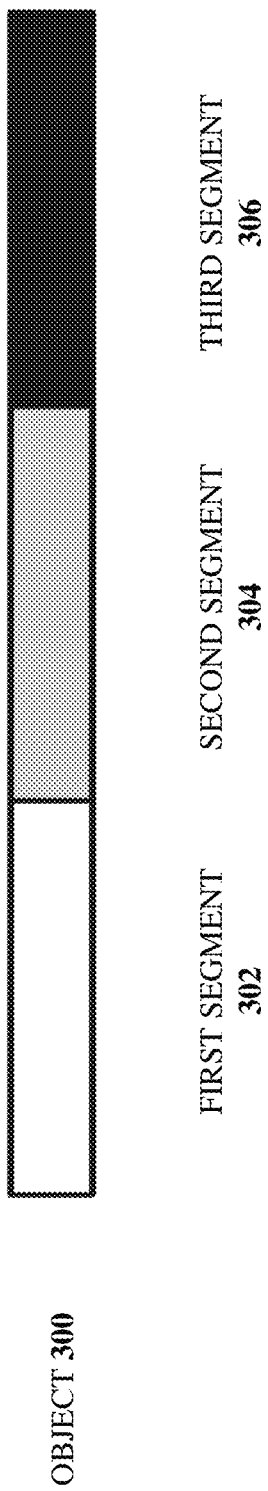
FIG. 3 illustrates an example, non-limiting, representation of a three-segment object.

FIG. 3 illustrates an example, non-limiting, representation of a three-segment object 300. As illustrated, the three-segment object 300 comprises a first segment 302, a second segment 304, and a third segment 306. The segments can be stored across a storage cluster. For example, the first segment 302 can be stored at a first storage device of the storage cluster, the second segment 304 can be stored at a second storage device of the storage cluster, and a third segment 306 can be stored at a third storage device of the storage cluster. However, the disclosed aspects are not limited to this implementation and two or more segments can be stored at the same storage cluster.

Figure 4:
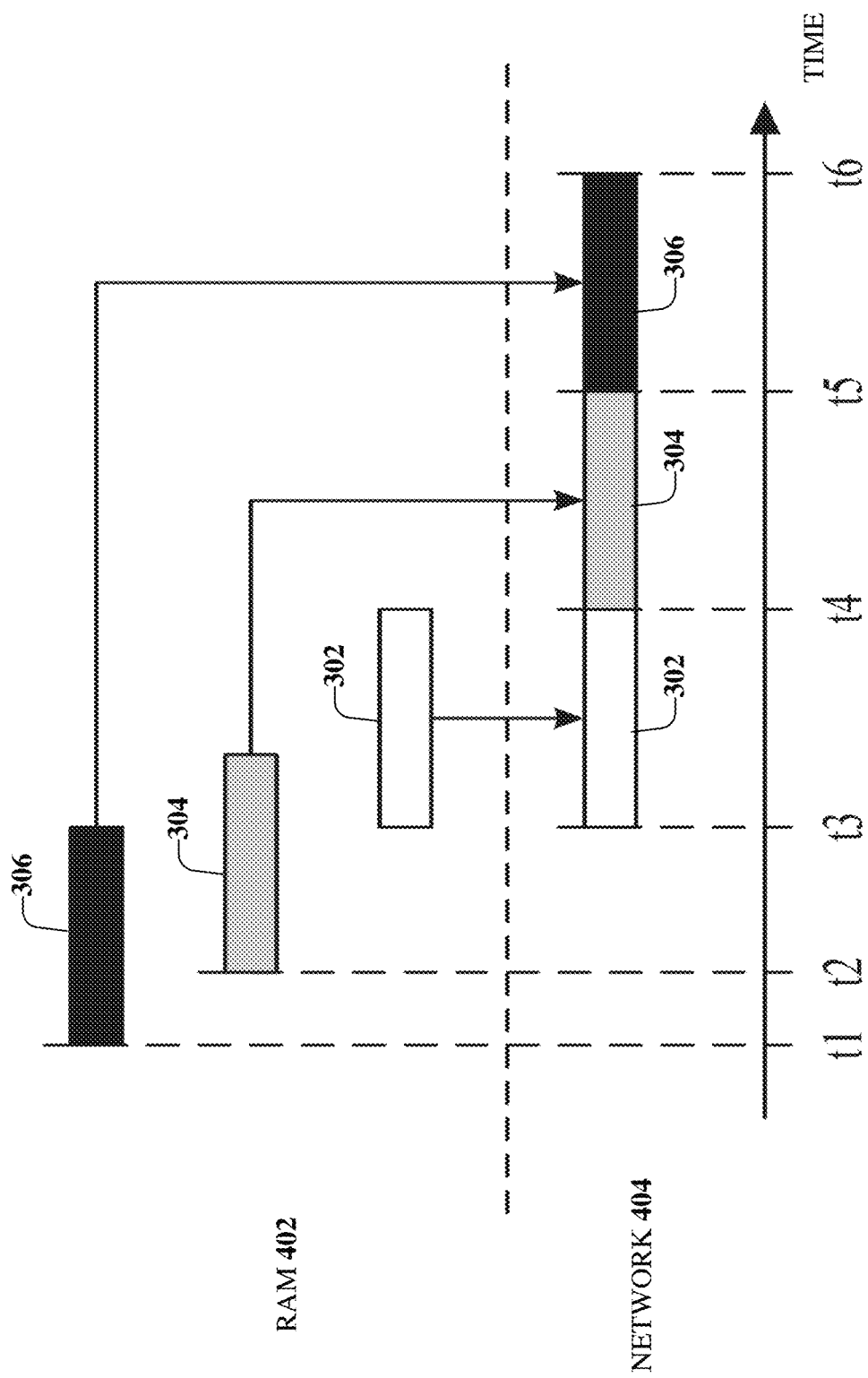
FIG. 4 illustrates an example, non-limiting, representation of handling a read request for the three-segment object of FIG. 3 using a traditional implementation.

FIG. 4 illustrates an example, non-limiting, representation of handling a read request for the three-segment object 300 of FIG. 3 using a traditional implementation. Repetitive description of like elements employed in other embodiments described herein is omitted for sake of brevity.

The node devices that serves the read request can reads the object's segments from different cluster node devices. In this example, the segments are received at the node device in a reverse order. Thus, the third segment 306 is received first (e.g., at time t1), the second segment 304 is received second (e.g., at time t2), and the first segment 302 is received third (e.g., at time t3).

Receiving packets in reverse order, or in another order, is not unusual. For example, the third segment could simply reside in the node that serves the read request and the first segment could reside in a node, which can be under a higher than average load. The node collects all three segments in its RAM 402, orders the segments, and sends the segments one by one as a single data portion. In this example, the first segment 302 is sent to the network 404 at time t3, the second segment 304 is sent to the network at time t4, and the third segment 306 is sent to the network at time t5.

Figure 5:
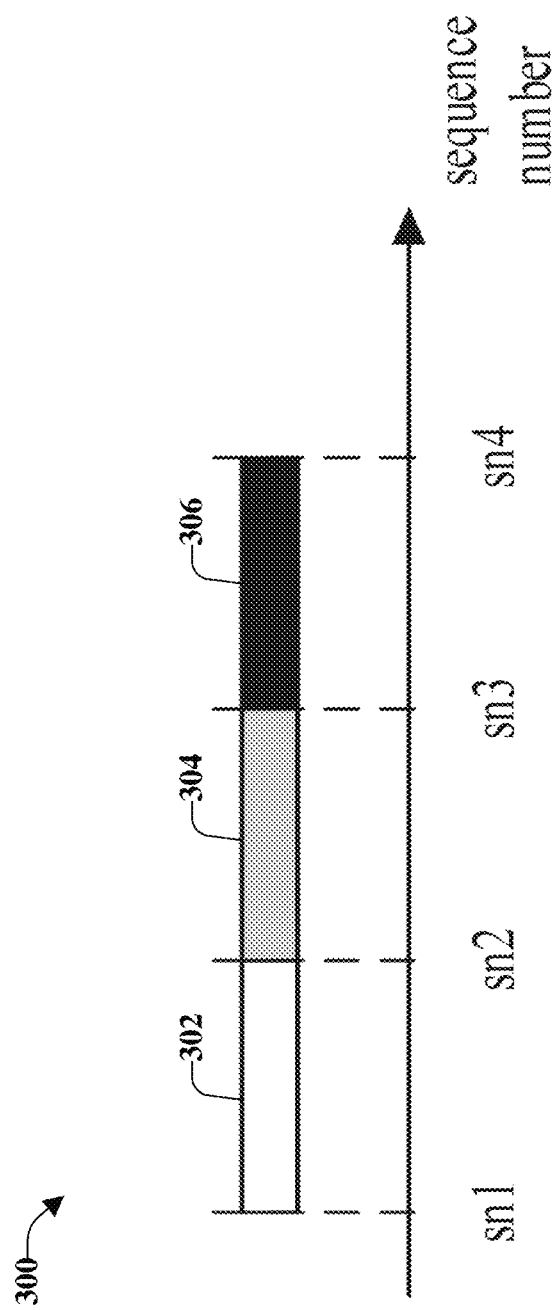
FIG. 5 illustrates an example, non-limiting, representation of the object data mapped to transmission control protocol packets.

FIG. 5 illustrates an example, non-limiting, representation of object data mapped to TCP packets. Repetitive description of like elements employed in other embodiments described herein is omitted for sake of brevity.

The object data 500 comprises the first segment 302, the second segment 304, and the third segment 306. Object data can occupy a continuous range of packets sequence numbers sn). The range can be [sn1 . . . sn4). According to various implementations, the range of packets sequence numbers can be reserved for the object segments. The range can be easily determined for a given pair (object_size, packet_size):

[next_seq_num,next_seq_num+ceil(object_size/packet_size))

Where next_seq_num is a sequence number of a next TCP packet. Accordingly, a range for an $i^{th}$ object segment can be calculated as follows:

[next_seq_num+(i−1)*def_seg_size,next_seq_num+(i−1)*def_seg_size+ceil(i_seg_size/packet_size))

Where def_seg_size is a default segment size and i_seg_size is a size of an $i^{th}$ segment. The latter can be less than def_seg_size for a last object's segment. Thus, a range of packets' sequence numbers can be known before a first byte of data comes to a node.

Figure 6:
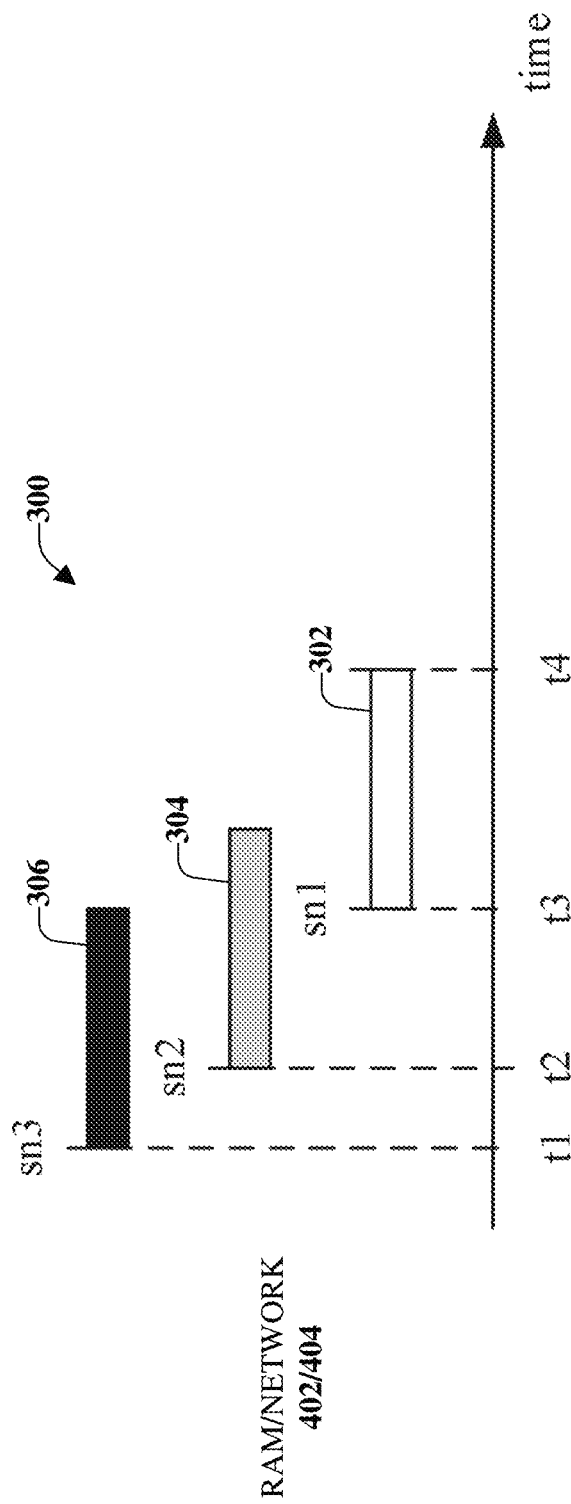
FIG. 6 illustrates an example, non-limiting representation of handling of read requests for a three-segment object of FIG. 3 in accordance with one or more embodiments described herein.

FIG. 6 illustrates an example, non-limiting representation of handling of read requests for a three-segment object 300 of FIG. 3 in accordance with one or more embodiments described herein. Repetitive description of like elements employed in other embodiments described herein is omitted for sake of brevity.

The node that serves the read request can transmit the object segments as they arrive at the node. Pre-calculated ranges of packets' sequence numbers can be used for the segments. That is, the range [sn1, sn2) can be used for the first segment 302, the range [sn2, sn3) can be used for the second segment, the range [sn3, sn4) can be used for the third segment. The TCP implementation at the storage client side can order the network packets it receives by their sequence numbers. As a result, all the object data can be properly ordered. The end user receives the object as if it was transmitted using the traditional method.

The one or more embodiments discussed herein do not require any alteration in the TCP. The protocol is smart enough already. Further, with the one or more embodiments, no alteration of a TCP implementation at a client side is required. Only a TCP implementation at a server (storage) side needs to be adjusted slightly. For example, the implementation should support reservation of ranges of packets' sequence numbers. In another example, the implementation should use a default packet_size for all packets from reserved ranges. In a further example, the implementation should be aware of out-of-order transmission so that massive dupacks (duplicate acknowledgements in TCP) cause no panic (e.g., no errors are generated).

According to some implementations, if not already provided, a server (storage services) should be provided with information about client's capabilities so that storage services can tune read path for a particular client. In further detail, storage clients are different. For example, a storage client could be an inexpensive smartphone or a powerful (application) server. Such devices have different capacities to process incoming data. There is a client's parameter TCP receive window (or simply TCP window) that characterize this capacity. An inexpensive smartphone could have 64K TCP window, for example. The parameter for a server can be configured up to the maximum value of 1,073,725,440 bytes.

For a use-case with the disclosed embodiments, the parameter characterizes ability of a client to assure ordered delivery of out-of-order transmitted segments. Namely, a smartphone will probably not be able to handle even a two-segment object. A server will probably be able to handle objects of almost any real-life size. A storage system must take this into account.

The following describes an implementation that can be used to tune read path for a particular client. A storage system can calculate a number of segments transmitted using the disclosed aspects that a given client can digest using the equation below:

$n$=floor(tcp_window/segment_size/$c$)

Where c is a coefficient (e.g. value of 2) that makes sure the client is not overburdened with input traffic. If n equals to 0 or 1, a storage system can fall back to the traditional ordered transmission (as discussed with respect to FIG. 4). When n is greater than 1, a storage system compares n with a number of segments in an object to be transmitted to the client (m). If m<=n, the disclosed out-of-order transmission can be used. Otherwise, the object's segments can be divided into:

ceil(m/n)

groups. Such groups can be transmitted to the client one by one. The disclosed aspects can be used to transmit segments within one group. Note that when there is a turn of another group to be transmitted, the group could already have all its segments ready. If this is the case, the segments are to be transmitted in the natural order.

Figure 7:
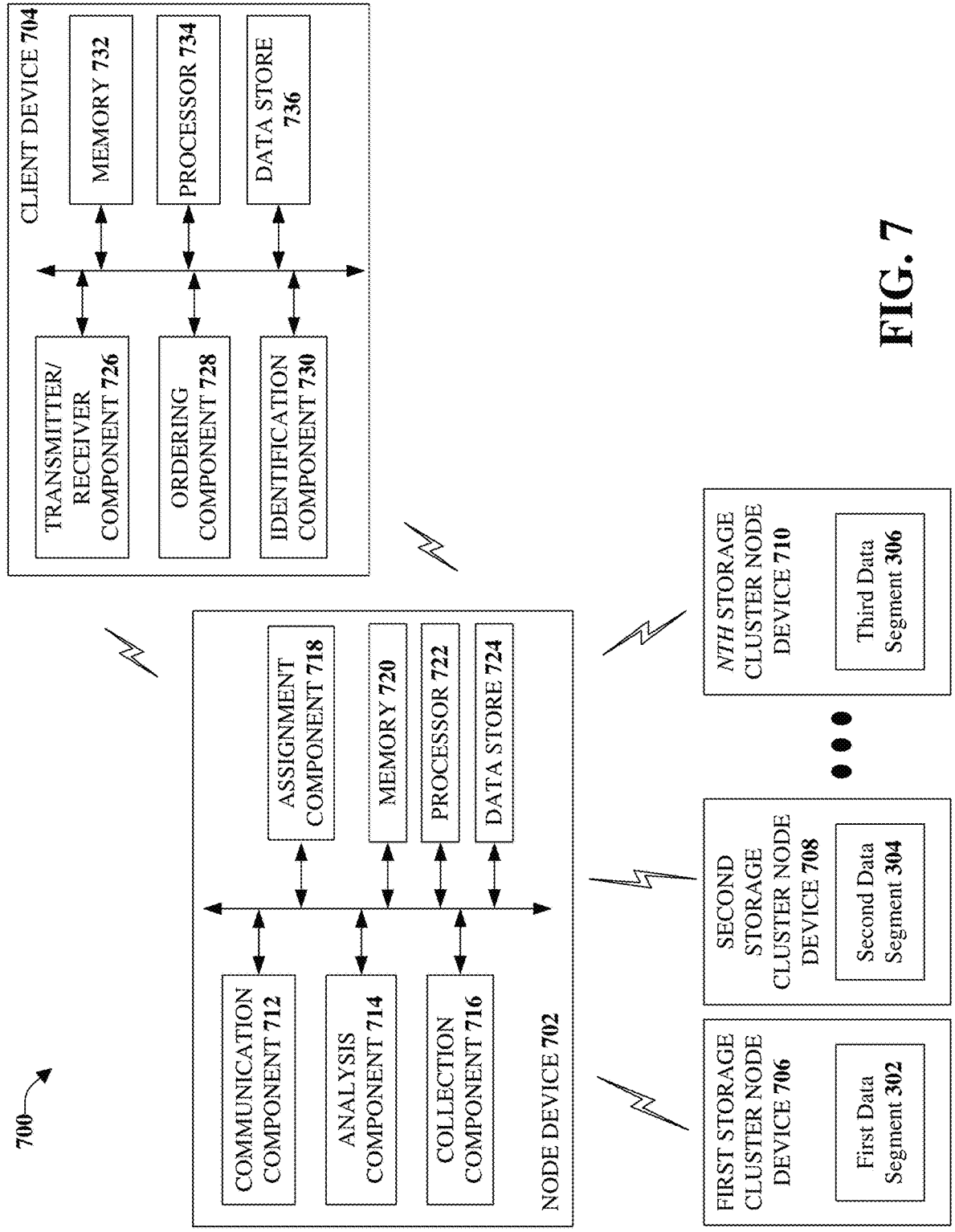
FIG. 7 illustrates an example, non-limiting, system for transmission of multi-segment data portions in accordance with one or more embodiments described herein.

FIG. 7 illustrates an example, non-limiting, system 700 for transmission of multi-segment data portions in accordance with one or more embodiments described herein. Repetitive description of like elements employed in other embodiments described herein is omitted for sake of brevity.

The system 700 can include a node device 702 that can serve read requests received from a client device 704. To respond to the read requests, the node device 702 can obtain object segments from one or more storage cluster nodes, illustrated as a first storage cluster node device 706, a second storage cluster node device 708, and an Nth storage cluster node device 710, where N is an integer. The multiple storage cluster node devices can be geographically distributed nodes. Further, although not illustrated, the storage cluster node devices can comprise respective memories and/or processors.

The node device 702 can comprise a communication component 712, an analysis component 714, a collection component 716, an assignment component 718, at least one memory 720, at least one processor 722, and at least one data store 724. The client device 704 can comprise a transmitter/receiver component 726, an ordering component 728, an identification component 730, at least one memory 732, at least one processor 734, and at least one data store 736.

The client device 704 can send (e.g., via the transmitter/receiver component 726) a read request for object data to the node device 702, which can receive the request via the communication component 712. The object data can comprise multiple segments stored across a storage cluster. For example, a first segment 302 can be retained by the first storage cluster node device 706, the second segment 304 can be retained by the second storage cluster node device 708, and at least a third segment (e.g., the third segment 306) can be retained by the Nth storage cluster node device 710.

The analysis component 714 can determine a storage capacity of the client device 704. According to an implementation, the analysis component 714 can determine the storage capacity satisfies a first defined storage capacity, which indicates the client device 704 can handle the ordering of a large number of segments. According to another implementation, the analysis component 714 can determine the storage capacity satisfies a second defined storage capacity, but does not satisfy the first storage capacity, which indicates the client device 704 can handle the ordering of packets on a group by group basis. In accordance with some implementations, the analysis component 714 can determine the storage capacity fails to satisfy the first defined storage capacity and the second defined storage capacity, which indicates the client device 704 cannot handle the ordering of any number of segments.

Based on a determination by the analysis component 714 that the storage capacity of the client device 704 satisfies the first defined capacity, the segments of the multiple segments (e.g., the first segment 302, the second segment 304, the third segment 306) can be transmitted to the client device 704 in a received order (e.g., via the communication component 712). According to this implementation, there is no processing performed by the node device 702. Instead, the segments are received at the node device 702 and transferred to the client device 704. Thus, even though the segments are received at the node device 702 in an arbitrary order (e.g., out of order transmission), no ordering is performed and the segments are transmitted to the client device 704 in the arbitrary order.

Further to this implementation, the client device 704, upon or after receipt of the segment (e.g., via the transmitter/receiver component 726) can facilitate an ordering of the object data by the ordering component 728. For example, the ordering component 728 can order segments of the multiple segments based on respective packet sequence numbers associated with the segments, resulting in a properly ordered object data. For example, the respective packet sequence numbers can be respective precalculated ranges of packet sequence numbers associated with the segments of the multiple segments. In another example, the node device 702 can use a default packet size from a set of reserved packet ranges.

In accordance with some implementations, the object data can occupy a continuous range of packet sequence numbers [sn1 . . . sn4). Thus, the assignment component 718 an assign a first range [sn1, sn2) to the first segment 302, a second range [sn2, sn3) to the second segment 304, a third range [sn3, sn4) to the third segment 306, and so on. The identification component 730, upon or after receipt of the respective packets can determine the first segment 302 based on the first range [sn1, sn2), can determine the second segment 304 based on the second range [sn2, sn3), can determine the third segment 306 based on the third range [sn3, sn4), and so on.

Further, the node device 702 can ignore duplication acknowledgments received in response to transmitting the segments of the multiple segments in the received order (e.g., the arbitrary order or out-of-order transmission).

Alternatively, the analysis component 714 can determine that the storage capacity of the client device 704 fails to satisfy the first defined capacity, but satisfies a second defined capacity. In this implementation, the collection component 716 can divide the multiple segments into a first group of segments and at least a second group of segments. The first group of segments can be transmitted to the client device 704 by the communication component 712. After a defined interval, the communication component 712 can transmit the second group of segments to the client device 704. Further segments can be transmitted after respective time intervals. The duration of the time interval can be selected to allow the client device 704 time to order the received segments in the group of segments. Thus, the time interval allows time for the first group of packets to be ordered by the client device 704 before the second group of packets is sent to the client device 704.

Alternatively, the analysis component 714 can determine that the storage capacity of the client device 704 fails to satisfy both the first defined capacity and the second defined capacity. In this implementation, the segments can be retained at the node device 702. Upon or after receipt of all the segments, or at least a portion of the segments, the collection component 716 can order the segments. The segments, in the correct packet order, can be transmitted to the client device 704.

As used herein, the term "storage device," "first storage device," "storage cluster nodes," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

In some cases, the storage devices (e.g., the first storage cluster node device 706, the second storage cluster node device 708, the Nth storage cluster node device 710) can be included in respective storage clusters, which can include one or more services and/or one or more storage devices. In some embodiments, a storage device can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

With continuing reference to the node device 702, the at least one memory 720 can be operatively coupled to the at least one processor 722. The at least one memory 720 can store protocols associated with facilitating transmission of multi-segment data portions in response to a read request as discussed herein. Further, the at least one memory 720 can facilitate actions to control communication between the node device 702, the client device 704, and the one or more storage devices (e.g., the first storage cluster node device 706, the second storage cluster node device 708, the Nth storage cluster node device 710), such that the system 700 can employ stored protocols and/or algorithms to achieve improved read performance characteristics as described herein.

Further, with reference to the client device 704, the at least one memory 732 can be operatively coupled to the at least one processor 734. The at least one memory 732 can store protocols associated with facilitating receipt and ordering of multi-segment data portions in response to a read request as discussed herein. Further, the at least one memory 732 can facilitate actions to control communication between the node device 702 and the client device 704 such that the system 700 can employ stored protocols and/or algorithms to achieve improved read performance characteristics as described herein.

It should be appreciated that data store components (e.g., the at least one memory 720, the at least one memory 732) described herein can be either volatile memory, nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include RAM, which acts as external cache memory. By way of example and not limitation, RAM is available in many forms such as synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 722 can facilitate processing data related to transmission of multi-segment data portions as discussed herein. The at least one processor 722 can be a processor dedicated to analyzing and/or generating information received, a processor that controls one or more components of the system 700, and/or a processor that both analyzes and generates information received and controls one or more components of the system 700.

Further, the at least one processor 734 can facilitate processing data related to receipt and ordering of multi-segment data portions received in an arbitrary order as discussed herein. The at least one processor 734 can be a processor dedicated to analyzing and/or generating information received, a processor that controls one or more components of the system 700, and/or a processor that both analyzes and generates information received and controls one or more components of the system 700.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 8:
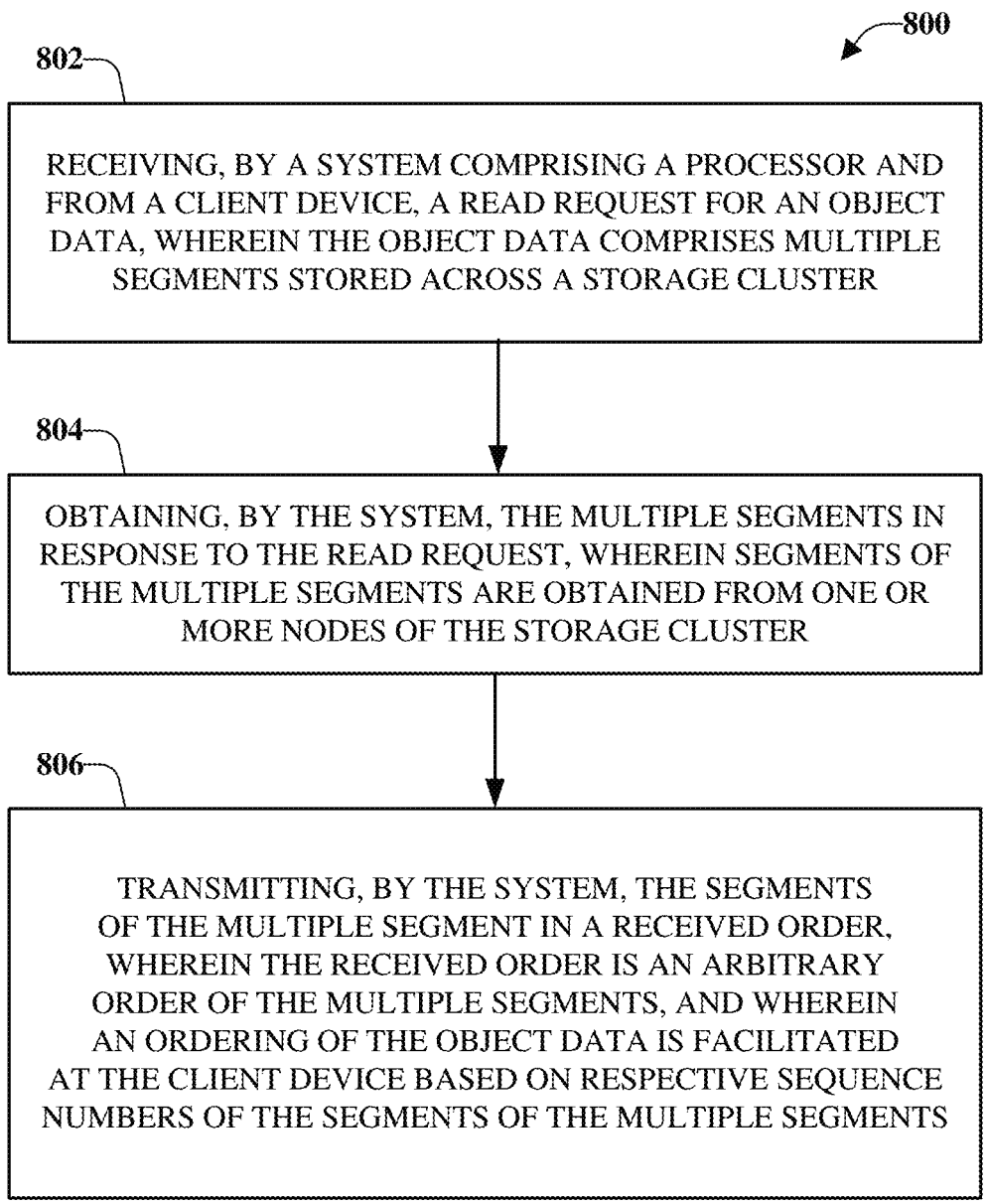
FIG. 8 illustrates a flow diagram of an example, non-limiting, computer-implemented method that facilitates transmission of multi-segment data portions in accordance with one or more embodiments described herein.

FIG. 8 illustrates a flow diagram of an example, non-limiting, computer-implemented method 800 that facilitates transmission of multi-segment data portions in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. For example, the device can be a node device (e.g., the node device 702) in other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a system comprising a processor can receive a read request for an object data (e.g., via the communication component 712). The object data comprises multiple segments stored across a storage cluster.

The multiple segments can be obtained, at 804 of the computer-implemented method 800, in response to the read request (e.g., via the collection component 716). Segments of the multiple segments can be obtained from one or more nodes of the storage cluster. For example, the multiple segments can comprise a first segment obtained from a first node of the storage cluster, a second segment obtained from a second node of the storage cluster, and at least a third segment obtained from at least a third node of the storage cluster.

Further, at 806 of the computer-implemented method 800, the system can transmit the segments of the multiple segments in a received order (e.g., via the communication component 712). The received order can be an arbitrary order of the multiple segments.

Further, the ordering of the object data can be facilitated at the client device based on respective sequence numbers of the segments of the multiple segments. For example, the respective sequence numbers can comprise respective pre-calculated ranges of packet sequence numbers for the segments of the multiple segments.

For example, the object data can occupy a continuous range of packet sequence numbers [sn1 ... sn4]. Thus, a first range [sn1, sn2) can be assigned to a first packet of the multiple segments. A second range [sn2, sn3) can be assigned to a second packet of the multiple segments. Further, a third range [sn3, sn4) can be assigned to a third segment of the multiple segments, and so on.

Figure 9:
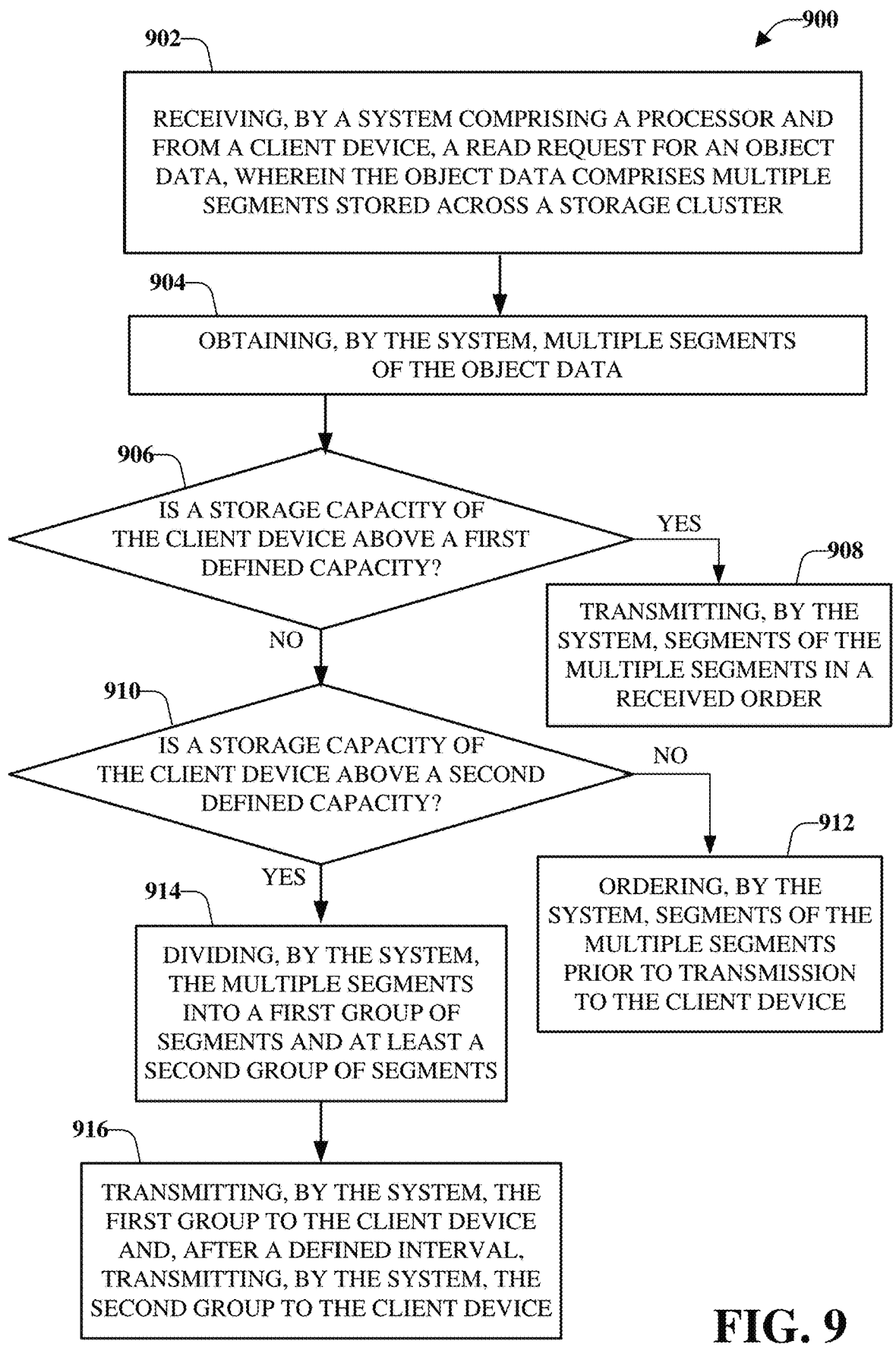
FIG. 9 illustrates a flow diagram of an example, non-limiting, computer-implemented method that facilitates selective transmission of multi-segment data portions based on a storage capacity of a client device in accordance with one or more embodiments described herein.

FIG. 9 illustrates a flow diagram of an example, non-limiting, computer-implemented method 900 that facilitates selective transmission of multi-segment data portions based on a storage capacity of a client device in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. For example, the device can be a node device (e.g., the node device 702) in other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

At 902 of the computer-implemented method 900, a system comprising a processor can receive a read request for an object data (e.g., via the communication component 712). The object data can comprise multiple segments stored across a storage cluster. Based on the read request, at 904 of the computer-implemented method 900, multiple segments of the object data can be obtained (e.g., via the collection component 716). For example, segments of the multiple segments can be obtained from one or more nodes of a storage cluster.

A determination can be made, at 906 of the computer-implemented method 900, whether the storage capacity of the client device is above a first defined threshold (e.g., via the analysis component 714). If the capacity satisfies the first defined threshold ("YES"), at 908, segments of the multiple segments can be transmitted to the client device upon or after receipt of the segment, at 904 (e.g., via the communication component 712). For example, the packets can be sent in an arbitrary order (e.g., an out of order transmission). Duplicate acknowledgements received in response to the transmission of the packets in the received order can be ignored (e.g., no errors are generated).

If the determination at 906 is that the storage capacity does not satisfy the first defined storage capacity ("NO"), at 910 a second determination is made whether the storage capacity satisfies a second defined storage capacity (e.g., via the analysis component 714). The second defined storage capacity can be a smaller sized storage capacity (e.g., less memory space) than the first defined storage capacity.

If the storage capacity of the client device does not satisfy the second defined storage capacity ("NO"), at 912, packets of the multiple packets are ordered prior to being transmitted to the client device (e.g., via the collection component 716). The packets are ordered prior to the transmission because it is determined that the client device does not have the capability to order the packets.

Alternatively, if the storage capacity of the client device does satisfy the second defined storage capacity ("YES"), at 914, the multiple segments can be divided into a first group of segments and at least a second group of segments (e.g., via the collection component 716). Further, at 916, the first group can be transmitted to the client device and, after a defined interval, the second group can be transmitted to the client device (e.g., via the communication component 712).

Figure 10:
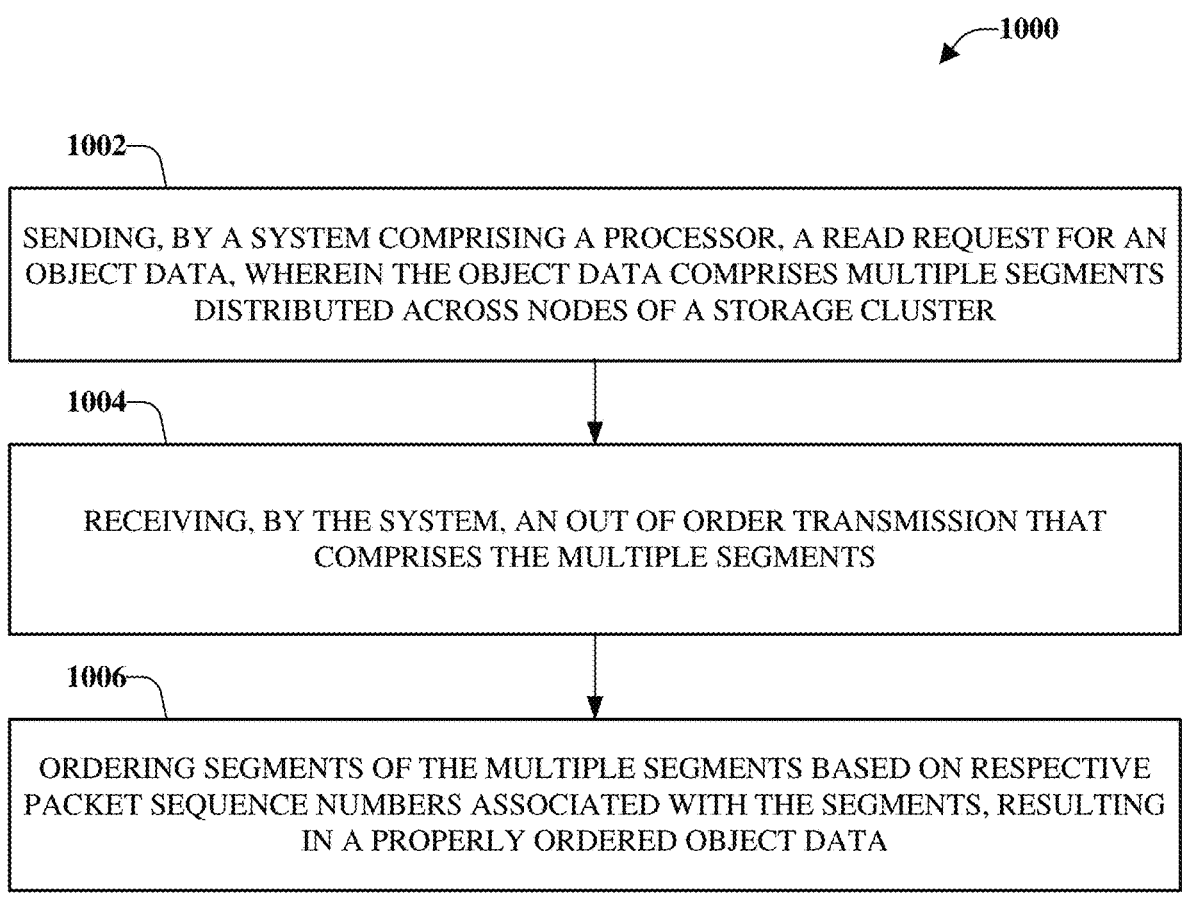
FIG. 10 illustrates a flow diagram of an example, non-limiting, computer-implemented method that facilitates receipt of multi-segment data portions sent in an arbitrary order in accordance with one or more embodiments described herein.

FIG. 10 illustrates a flow diagram of an example, non-limiting, computer-implemented method 1000 that facilitates receipt of multi-segment data portions sent in an arbitrary order in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. For example, the device can be a client device (e.g., the client device 704) in other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

At 1002 of the computer-implemented method 1000, a system comprising a processor can send a read request for an object data (e.g., via the transmitter/receiver component 726). The object data can comprise multiple segments distributed across nodes of a storage cluster. For example, the multiple segments can comprise a first segment storage at a first node of the storage cluster, a second segment stored at a second node of the storage cluster, a third segment stored at a third node of the storage cluster, and so on. In some implementations, a node of the storage cluster can retain more than one segment.

An out of order transmission that comprises the multiple segments can be received, at 1004 of the computer-implemented method 1000 (e.g., via the transmitter/receiver component 726). For example, the segments can be received in substantially the same order as the segments are received at a node device.

At 1006, segments of the multiple segments can be ordered based on respective packet sequence numbers associated with the segments, resulting in a properly ordered object data (e.g., via the ordering component 728). The respective packet sequence numbers can be respective precalculated ranges of packet sequence numbers associated with the segments of the multiple segments.

According to some implementations, the object data can occupy a continuous range of packet sequence numbers [sn1 ... sn4). Thus, a first segment can be determined based on a first range [sn1, sn2). Further, a second segment can be determined based on a second range [sn2, sn3). A third segment can be determined based on a third range [sn3, sn4), and so on.

Figure 11:
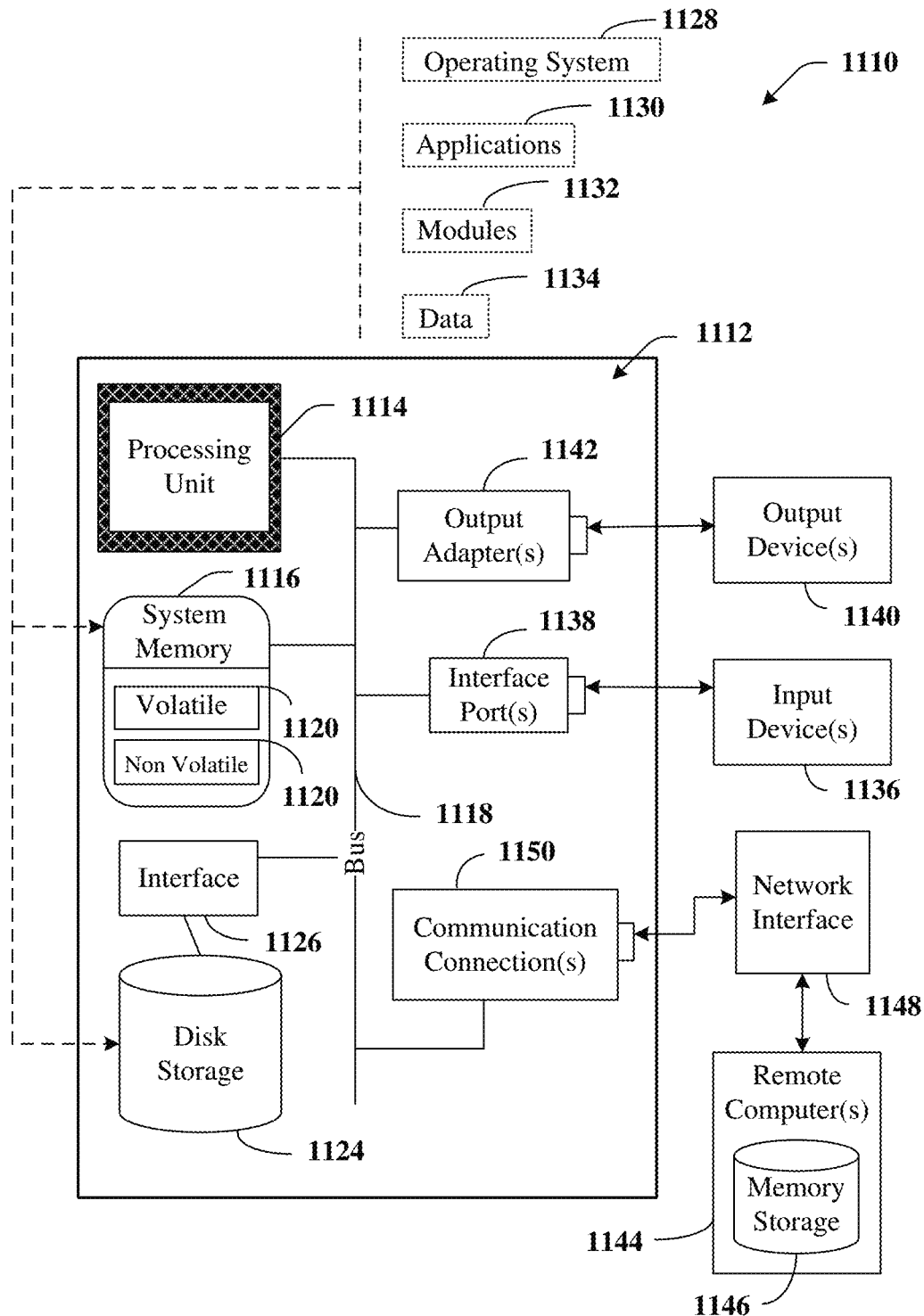
FIG. 11 illustrates an example, non-limiting, computing environment in which one or more embodiments described herein can be facilitated.

In order to provide a context for the various aspects of the disclosed subject matter, FIG. 11 as well as the following discussion are intended to provide a brief, general description of a suitable environment in which the various aspects of the disclosed subject matter can be implemented.

With reference to FIG. 11, an example environment 1110 for implementing various aspects of the aforementioned subject matter comprises a computer 1112. The computer 1112 comprises a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 comprises volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can comprise read only memory (ROM), programmable ROM (PROM), electrically programmable ROM (EPROM), electrically erasable PROM (EEPROM), or flash memory. Volatile memory 1120 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also comprises removable/non-removable, volatile/non-volatile computer storage media. FIG. 11 illustrates, for example a disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software comprises an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 comprise, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 comprise, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically comprises many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 comprises, for exemplary purposes only, internal and external technologies such as, modems including regular telephone grade modems, cable modems and DSL modems, ISDN adapters, and Ethernet cards.

Figure 12:
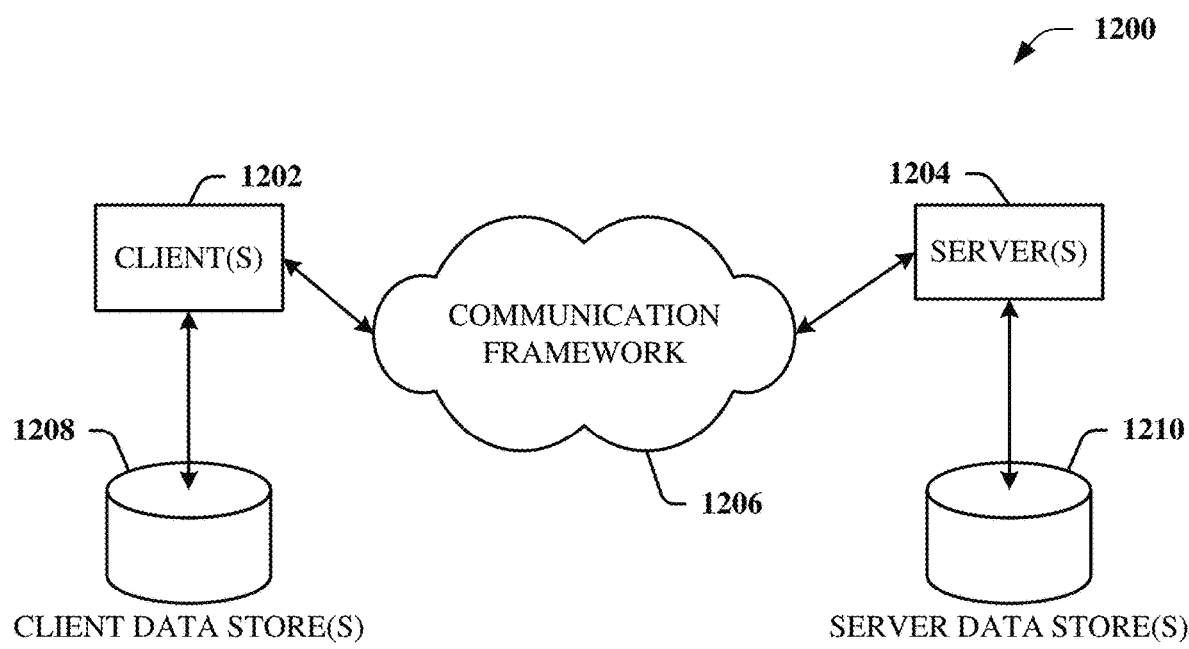
FIG. 12 illustrates an example, non-limiting, networking environment in which one or more embodiments described herein can be facilitated.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a system comprising a processor and from a client device, a read request for object data, wherein the object data comprises multiple segments stored across a storage cluster;
    obtaining, by the system, the multiple segments in response to the read request, wherein segments of the multiple segments are obtained from one or more nodes of the storage cluster;
    determining, by the system, whether a storage capacity of the client device satisfies a first defined storage capacity, or is below the first defined storage capacity and above a second defined storage capacity;
    based on the storage capacity satisfying the first defined storage capacity, transmitting, by the system, the segments of the multiple segments in a received order, wherein the received order is an order in which the segments of the multiple segments are obtained by the system, and wherein the received order is an arbitrary order of the multiple segments, and wherein an ordering of the object data is facilitated at the client device based on respective sequence numbers of the segments of the multiple segments; and
    based on the storage capacity being below the first defined storage capacity and above the second defined storage capacity,
        dividing the multiple segments into a first group of segments and a second group of segments,
        transmitting the first group of segments to the client device, and
        after a defined interval, transmitting the second group of segments to the client device.

2. The method of claim 1, wherein the respective sequence numbers comprise respective precalculated ranges of packet sequence numbers for the segments of the multiple segments.

3. The method of claim 1, wherein the object data occupies a continuous range of packet sequence numbers.

4. The method of claim 3, further comprising:
    assigning, by the system, a first range of the packet sequence numbers to a first packet of the multiple segments;

assigning, by the system, a second range of the packet sequence numbers to a second packet of the multiple segments; and assigning, by the system, a third range of the packet sequence numbers to a third segment of the multiple segments.

5. The method of claim 3, further comprising:

using, by the system, a default packet size from a set of reserved packet ranges.

6. The method of claim 1, wherein the multiple segments comprise a first segment obtained from a first node of the storage cluster, a second segment obtained from a second node of the storage cluster, and at least a third segment obtained from at least a third node of the storage cluster.

7. The method of claim 1, further comprising:

ignoring, by the system, duplicate acknowledgments received in response to the transmitting the segments of the multiple segments in the received order.

8. The method of claim 1, wherein the arbitrary order of the multiple segments comprises an out of order transmission of the multiple segments.

9. A system, comprising:

a processor; and a memory that stores executable instructions that, when executed by the processor, facilitate performance of operations, comprising:

sending a read request for object data associated with an object, wherein the object data comprises multiple segments distributed across nodes of a storage cluster;

receiving an out of order transmission that comprises the multiple segments, wherein the out of order transmission is based on segments of the multiple segments being received via respective paths resulting in the segments being received in a different order as compared to an order in which the segments were sent to the system, wherein the receiving comprises:

based on a storage capacity satisfying a first defined storage capacity, receiving the segments in an arbitrary order, or based on the storage capacity being below the first defined storage capacity and above a second defined storage capacity, receiving a first group of segments and, after a defined interval, receiving a second group of segments; and ordering the segments of the multiple segments based on respective packet sequence numbers associated with the segments, resulting in a properly ordered object data.

10. The system of claim 9, wherein the respective packet sequence numbers are respective precalculated ranges of packet sequence numbers associated with the segments of the multiple segments.

11. The system of claim 9, wherein the object data occupies a continuous range of packet sequence numbers [sn1 . . . sn4).

12. The system of claim 11, wherein the operations further comprise:

determining a first segment based on a first range [sn1, sn2);

determining a second segment based on a second range [sn2, sn3); and determining a third segment based on a third range [sn3, sn4).

13. The system of claim 9, wherein the multiple segments comprise a first segment received from a first node of the storage cluster, a second segment received from a second node of the storage cluster, and at least a third segment received from at least a third node of the storage cluster.

14. The system of claim 9, wherein the arbitrary order comprises the out of order transmission of the multiple segments.

15. A non-transitory computer-readable medium comprising instructions that, in response to execution, cause a system comprising a processor to perform operations, comprising:

determining a storage capacity of a client device based on receipt of a read request for object data, wherein the object data comprises multiple segments stored across a storage cluster, and wherein the storage capacity is an available amount of storage;

obtaining the multiple segments in response to the read request, wherein segments of the multiple segments are obtained from one or more nodes of the storage cluster; and performing one of:

transmitting the multiple segments in two portions based on the storage capacity of the client device satisfying a first defined storage capacity, wherein a first portion of the two portions comprises a first group of segments of the multiple segments and a second portion of the two portions comprises a second group of segments of the multiple segments; or transmitting the segments of the multiple segments in a received order based on the storage capacity of the client device satisfying a second defined storage capacity, wherein the received order is an order in which the segments of the multiple segments are received, and wherein no ordering is performed on the segments prior to the transmitting the segments in the received order, wherein the transmitting the multiple segments in the two portions comprises:

dividing the multiple segments into the first group of segments and the second group of segments, transmitting the first group of segments to the client device; and after a defined interval, transmitting the second group of segments to the client device.

16. The non-transitory computer-readable medium of claim 15, wherein the received order is an arbitrary order of the multiple segments, and wherein an ordering of the object data is facilitated at the client device based on respective sequence numbers of the segments of the multiple segments.

17. The non-transitory computer-readable medium of claim 15, wherein an ordering of the object data is facilitated at the client device based on respective sequence numbers of the segments of the multiple segments, and wherein the respective sequence numbers comprise respective precalculated ranges of packet sequence numbers for the segments of the multiple segments.

18. The non-transitory computer-readable medium of claim 15, wherein the object data occupies a continuous range of packet sequence numbers, and wherein the operations further comprise:

assigning a first range of the packet sequence numbers to a first packet of the multiple segments;

assigning a second range of the packet sequence numbers to a second packet of the multiple segments; and assigning a third range of the packet sequence numbers to a third segment of the multiple segments.

19. The non-transitory computer-readable medium of claim 17, wherein the arbitrary order of the multiple segments comprises an out of order transmission of the multiple segments.

20. The non-transitory computer-readable medium of claim 15, wherein the operations further comprise ignoring duplicate acknowledgments received in response to the transmitting the segments of the multiple segments in the received order.

* * * * *